United States Patent

[11] 3,607,740

| [72] | Inventor | Ewart Ingham Akeroyd<br>Thames Ditton, England |
|---|---|---|
| [21] | Appl. No. | 839,482 |
| [22] | Filed | July 7, 1969 |
| [45] | Patented | Sept. 21, 1971 |
| [73] | Assignee | The Permutit Company Limited<br>London, England |
| [32] | Priority | July 15, 1968 |
| [33] | | Great Britain |
| [31] | | 33666/68 |

[54] ION-EXCHANGE PROCESSES
8 Claims, 1 Drawing Fig.

[52] U.S. Cl. .................................................... 210/33,
210/223
[51] Int. Cl. ...................................................... B01d 15/02
[50] Field of Search ........................................... 210/24, 30,
33, 37, 38, 42, 222, 223

[56] References Cited
UNITED STATES PATENTS

| 2,642,514 | 6/1953 | Herkenhoff .................. | 210/30 |
| 3,160,585 | 12/1964 | Emmett et al. ............... | 210/33 X |
| 3,215,624 | 11/1965 | Frazer et al. .................. | 210/33 |
| 3,250,705 | 5/1966 | Levendusky .................. | 210/37 X |

*Primary Examiner*—Samih N. Zaharna
*Attorney*—Larson, Taylor and Hinds

ABSTRACT: In a continuous ion-exchange process for treating water with movement of the resin through a circuit that includes an absorber and a regenerator, the resin is in the form of magnetic beads less than 295 microns in size. These beads form beds presenting no more resistance to flow than beds of conventional resin beads, but as they do not break up on passing through pumps they can be forced into the absorber without interruption of the service flows.

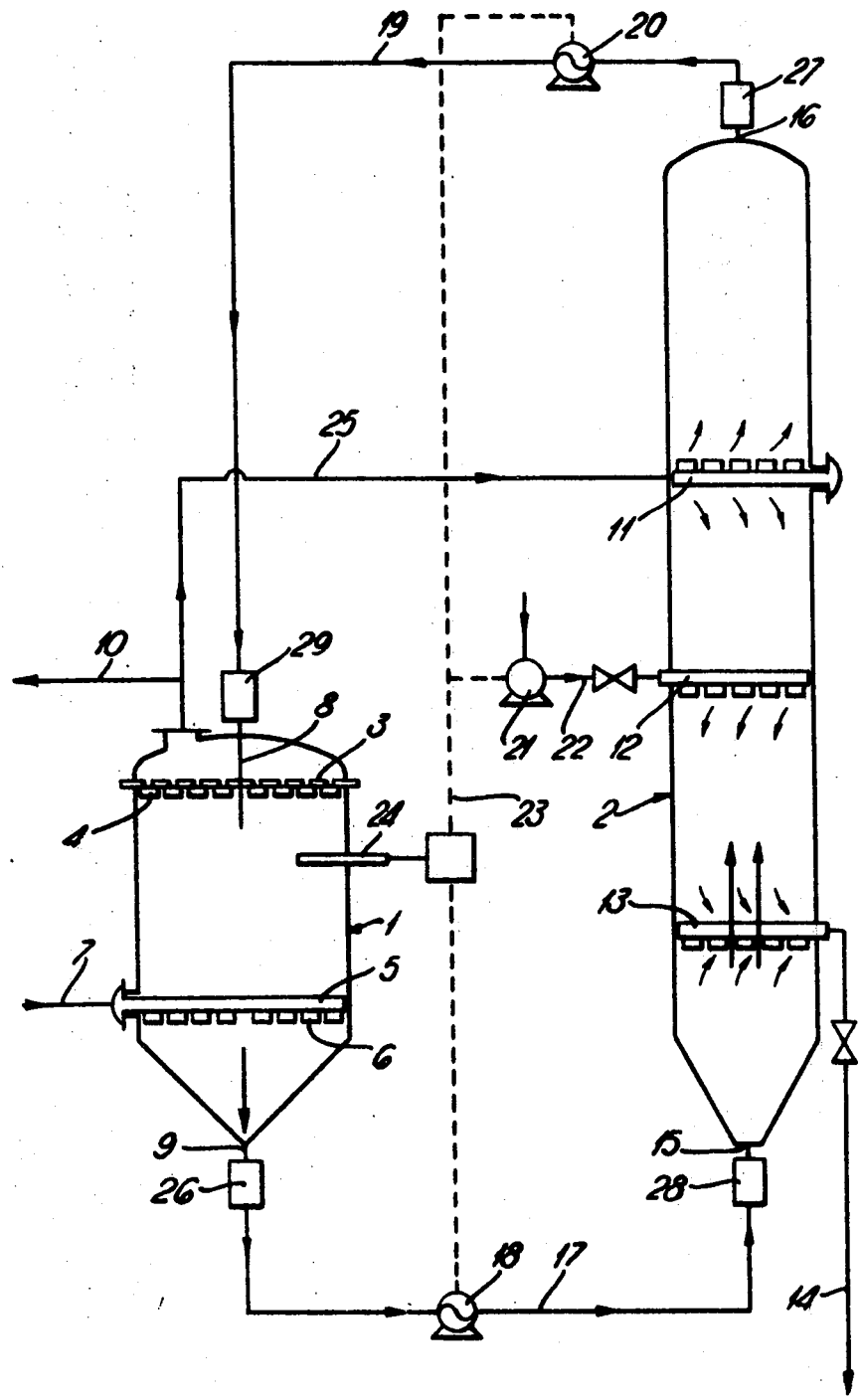

ION-EXCHANGE PROCESSES

In so-called continuous processes for the treatment of water or other aqueous liquid by ion exchange, the common practice is to pass the liquid through a bed of granules, normally beads, of an ion-exchange resin or mixture of such resins, remove exhausted resin from the liquid-inlet end of the bed, pass this resin through a regenerator and there regenerate it, and return regenerated resin from the regenerator to the liquid-outlet end of the bed in the absorber. The regenerated resin is rinsed to remove any excess regenerant from it, and this rinsing may be effected in the regenerator itself or in a separate vessel, the regenerated resin then being returned to the absorber through this vessel.

The interior of the absorber is under pressure so long as the liquid to be treated is flowing through it. Therefore if the flow of liquid in the absorber is continuous the freshly regenerated resin must be forced into the absorber against the working pressure, and it is very difficult to do this without physical damage to the granules. Normally, therefore, the operation is not truly continuous, but rather from time to time the flow of liquid under treatment is interrupted to enable fresh resin to be introduced at the liquid-outlet end of the bed. The intermittent nature of the operation is a disadvantage, and practical difficulties arise because of the need to stop and restart the flow of liquid under treatment at regular intervals.

The physical damage which is done to the granules if they are forced into the absorber under pressure consists of fracture, the granules rapidly breaking down into smaller particles, and this in turn leads to loss of resin and increased pressure drop across the bed. Now this disadvantage is invariably shown by granules of the size range normally used, which is between 1,200 and 295 microns, but it would not be produced if considerably smaller granules, below 150 microns, were used, as these can be pumped without material damage. However, such small particles are not used because the resistance to flow imposed by a bed of them is so great as to render the operating pressure losses prohibitive in practice.

It is known that finely divided magnetic material can be introduced into ion-exchange resin beads, and it has recently been shown that if beads of this type are subjected to a magnetic field by passage between the poles of a magnetic the beads form a coagulated mass which has a greater proportion of voids than a bed of the same unmagnetized resin. This coagulated mass behaves as a viscous liquid.

According to the invention the resin used in a continuous ion-exchange process is in the form of such magnetic particles containing finely divided magnetic material and of particle size less than 295 microns and preferably less than 150 microns. When the particles are formed into a bed it is possible to pass liquid through it quite rapidly without excessive pressure loss, the reason being that the coagulated mass behaves as if the particle size of the resin was much greater than it actually is so far as imposing resistance to the passage of liquid is concerned. A bed of the magnetized particles can be moved under pressure through a pump. When this is done, the mass may disintegrate to some extent, but it does so without fracture of the particles themselves. Thus the process is rendered truly continuous, freshly regenerated resin being pumped into the absorber without interruption of the liquid flow and without material damage to the particles.

The magnetization and consequent coagulation of the resin particles allows the flows through the regenerator also to take place without undesirably high pressure loss.

Because of the risk of disintegration of the coagulated mass and of demagnetization of the particles in their passage through the pumps, it is highly desirable to remagnetize them as they reenter both the absorber and the regenerator. This remagnetization may be effected, for example, by passage of the particles through the center of an electromagnetic coil connected to a source of direct current, the coil surrounding a pipe in which the particles are flowing. In addition, to facilitate the pumping operation, the resins may be demagnetized, for example by passage through another coil connected to a source of high frequency alternating current, as they are removed from the absorber or regenerator.

The removal of the resin particles from the absorber and the return of regenerated particles to it may be continuous or intermittent. In either case two pumps, one for drawing a slurry of particles in liquid from the absorber and the other for forcing a similar slurry into the absorber, are preferably so interconnected that the amounts of resin flowing through each in unit time are always the same. If the movement of the resin is continuous, the pumps of course run continuously and the volume of resin moved may be controlled by varying the speed of the pumps. If the movement is intermittent, the pumps are started and stopped together. In any case, the pumps may be controlled in accordance with the extent of exhaustion of the resin in the absorber by any of the methods well known in the art of ion exchange.

The magnetic particles are preferably copolymers, of the kind commonly used in ion-exchange processes today, except that finely divided magnetic iron oxide or ferrite has been introduced into them and that they are smaller than the beads commonly used. The particles may, however, be produced by grinding resins of the condensation type into which magnetic material has been introduced in the course of manufacture.

As the invention is of particular value in the softening of water by cation exchange, the particles will normally have cation-exchange properties, but of course magnetic particles with anion-exchange properties can be used in processes in which a liquid is passed through a bed of anion-exchange material.

An example of the production of beads of sulphonated cross-linked polystyrene with magnetic properties is as follows.

A mixture of 12 ml. divinyl benzene concentrate containing 6.95 ml. divinyl benzene and 0.8 g. benzoyl peroxide (containing 20 percent moisture) was dried and then mixed with 72 ml. styrene containing 1.3 g. of a water-in-oil emulsifying agent sold under the Trade Mark Colorol 30. 50 g. magnetic iron oxide of particle size less than 1 micron was dispersed in this mixture with the help of an efficient stirrer.

The monomer mixture containing dispersed iron oxide was dispersed in a polymerization vessel at 90° C. into droplets of particle size smaller than 150 microns in an aqueous suspension formed by mixing 300 ml. water, 25 ml. 25 percent calcium chloride solution, 120 g. sodium chloride and 66 ml. 5 percent sodium orthophosphate solution. Polymerization was then effected by heating in the temperature range of 80 to 85° C. for 6 hours, yielding beads, which were sieved, washed and dried at 80° C. These beads were then swollen in excess ethylene dichloride and sulphonated in the conventional manner with oleum. The sulphonated beads were then converted to the sodium form by means of sodium acetate. Their average size was 125 microns.

Another example of the production of beads of sulphonated cross-linked polystyrene with magnetic properties is as follows. 2 g. polyethylene glycol of high molecular weight were dispersed in 95 ml. styrene, and then 1 g. zinc stearate, a dried mixture of 17 ml. divinyl benzene concentrate containing 9.85 ml. divinyl benzene and 1 g. benzoyl peroxide (20 percent moisture) and 67 g. of a hard ferrite were successively stirred into the dispersion. The resultant dispersion was suspended in the form of droplets of less than 100 mesh size in an aqueous solution composed of 400 ml. water, 120 g. sodium chloride and 4 g. hydroxy-ethyl cellulose, and polymerized in the temperature range of 80 to 85 C. for 6 hours. The beads obtained were then sulphonated as in the previous example, and were of 125 micron average size.

An example of the production of a condensation resin with magnetic properties is as follows.

26.6 g. phenol, 81.3 ml. water, 23.0 g. sodium metabisulphite, 47.7 ml. formaldehyde (37 percent–41 percent w/v) and 9.2 g. sodium hydroxide were mixed in a reaction vessel, and the mixture was boiled for 1 hour. Thereafter 21.7 g. phenol, 40.7 ml. formaldehyde (37 percent–41 percent w/v)

and 17.4 g. magnetic iron oxide were added and the heating was continued under reflux and vigorous stirring until the solution thickened. The mixture was then poured into trays, where it gelled, and it was then cured for 24 hours in an oven at 150° C. The cured resin was broken into pieces and ground, and particles in the size range of 295 to 104 microns were separated by sieving and treated with sodium chloride solution to convert the resin to the sodium form.

Magnetic resin particles suitable for use in the present invention may also be made by the process described in U.S. specification No. 2,642,514.

In carrying out the process of the invention the flow of liquid in either the absorber or the regenerator may be either upwards or downwards. The movement of the resin is of course in the opposite direction to that of the liquid.

The invention includes an ion-exchange plant comprising an absorber, a regenerator, connections between the absorber and regenerator for the movement of resin from the one to the other and back again, a pump in each connection, and devices for magnetizing the particles in their passage from each pump to the absorber or regenerator as the case may be.

One process and apparatus according to the invention will now be described by way of example with reference to the accompanying diagrammatic drawing, which is a flow diagram.

In the drawing the absorber is shown at 1 and the regenerator at 2. The absorber 1 is spanned by a perforated plate 3, the perforations in which are occupied by strainers 4 which allow liquid but not the resin beads to pass. The openings in these strainers may, for example, be about 0.01 inch wide. The absorber is also spanned by a conventional water-distributing system 5 having strainers 6, this system being connected to the main water inlet pipe shown at 7. There is a resin-inlet pipe 8 which terminates just below the plate 3, a resin-outlet pipe 9 at the bottom of the absorber, and an outlet pipe 10 for treated water. At all times the space in the absorber below the plate 3 is occupied by a bed of magnetized and coagulated resin beads. The incoming water flows upwards through the part of the bed above the distributing system 5, and passes through the strainers 4 and leaves through the pipe 10.

The regenerator 2 is spanned by a distributing system 11 for water, a distributing system 12 for a regenerant, and a collecting system 13 from which a pipe 14 runs to a drain. At the bottom of the regenerator there is an inlet 15 for exhausted resin and at the top there is an outlet 16 for regenerated resin. The resin outlet 9 from the absorber 1 is connected to the resin inlet 15 in the regenerator by a pipeline 17 in which there is a rotary pump 18, and the resin outlet 16 from the regenerator is connected to the resin inlet 8 in the absorber by a similar pipeline 19 in which there is a rotary pump 20. Regenerant is supplied to the distributing system 12 from a source not shown by a pump 21 through a pipe 22. The pumps 18, 20 and 21 are electrically controlled through a single circuit as indicated by a broken line 23 which includes the electrical part of a conventional detector 24 which is let into the wall of the absorber 1 and serves to give a signal on a change in the ionic state of the water flowing upwards through the absorber or of the resin. This signal serves to start the three pumps, which thereupon run until the signal ceases as a result of the reversal of the ionic state. This control, which may be replaced by any other appropriate form of control, ensures that the rate of movement of resin round the circuit containing the absorber and regenerator is such that the ion-exchange capacity represented by the regeneration balances the ions removed from the raw water.

The exhausted resin is carried from the absorber 1 through the pipe 17 as a slurry in part of the raw water that enters the absorber, this part flowing downwards to the outlet 9 instead of upwards through the bed of resin. The regenerated resin is carried from the regenerator to the absorber as a similar slurry in softened water flowing through a pipe 25 which branches from the pipe 10 and runs to the distributing system 11. Some of the water thus introduced into the regenerator flows downwards to rinse excess regenerant from the resin. The carrier water entering through the resin inlet 15, waste regenerant and the rinsing water all leave the regenerator through the collecting system 13 and the pipe 14 to a drain.

Of course, whenever regenerated resin is introduced into the top of the absorber 1 and a similar quantity of exhausted resin is removed at the bottom, the whole bed moves downwards. Similarly the resin in the regenerator moves upwards under the pressure of the resin introduced through the inlet 15. Demagnetizing devices 26 and 27 are provided close to the resin outlets 9 and 16 respectively, and magnetizing devices 28 and 29 are provided close to the resin inlets 15 and 8 respectively.

If the resin movement is continuous instead of intermittent, it is desirable to provide a second detector in the absorber below the detector 24 so that two signals are produced, and to integrate these signals to control the speed of the pumps in such a way as to maintain the desired ionic state in the bed of resin.

As a specific example sulphonated polystyrene beads of average size 125 microns were magnetized and formed into a bed in an absorber of a pilot plant constructed as shown in the drawing. Both the absorber and the regenerator were 6 inches in diameter, and the height of the bed of beads in the absorber was 3 feet. The water to be softened was London mains water containing 290 p.p.m. of total hardness and it flowed upwards through the bed at the rate of 3 gallons per minute. The detector 24 was about 1 foot below the plate 3 and connected to monitor the hardness of the water in the absorber continuously, and to start all three pumps when that hardness reached a value in the range of 7 to 10 p.p.m. The pumps 18 and 19 both pumped the resin beads as an aqueous slurry containing about 25 percent resin at a rate of about 0.1 gallon per minute. As the resin passed through the demagnetizing devices 26 and 27 it became demagnetized, the individual beads flowing easily as a slurry through the pipes and pumps until they reached the low frequency magnetizing devices 28 and 29. All the pumps, once started, ran for 5 minutes and then were stopped by the action of a time clock. The regenerant pump 21 is supplied a 15 percent solution of sodium chloride into the regenerator at the rate of 33 ml. per minute. Rinse water entered the distributing system 11 at the rate of 70 ml. per minute, serving the double purpose of diluting the regenerant and rinsing the resin above the distributor 12. The pressure loss across the bed in the absorber was 10 lbs. per square inch.

During the whole of this process there was no interruption at all in the flow of water being softened in the absorber, with the result that the process was truly continuous.

In contrast, unmagnetized resin beads of the conventional size when passed through the same circuit rapidly became so broken that a bed of them imposed far too great a resistance to flow.

I claim:

1. In a process for treating water or other aqueous liquid by passing it continuously through a bed of ion-exchange resin in an absorber and maintaining the ion-exchange capacity of the resin bed by removing exhausted resin from the liquid-inlet end of the bed, passing the exhausted resin through a regenerator and there regenerating it, and returning regenerated resin to the liquid-outlet end of the bed, the improvement wherein the resin is in the form of beads less than 295 microns in size containing finely divided magnetic material and wherein the beads are magnetized prior to being returned to said absorber to provide magnetized beads in said absorber.

2. A process according to claim 1 in which the beads are less than 150 microns in size.

3. A process according to claim 1 in which the particles are copolymer beads.

4. A process according to claim 1 in which the particles are remagnetized on entering the regenerator.

5. A process according to claim 4 in which the particles are demagnetized on leaving the absorber and regenerator.

6. In an ion-exchange plant having a resin movement circuit comprising an absorber, a regenerator, and connections between the absorber and regenerator for the movement of resin from the one to the other and back again, the improvement which comprises a pump in each connection, magnetic ion-exchange resin particles in the form of beads less than 295 microns in size formed into a bed in each of the absorber and the regenerator, and devices for magnetizing the particles in their passage from each pump through the circuit.

7. A plant according to claim 6 including devices for demagnetizing the particles in each connection before they reach the pump in that connection.

8. A plant according to claim 6 including a pump for supplying regenerant to the regenerator and means for starting all three pumps together.